UNITED STATES PATENT OFFICE.

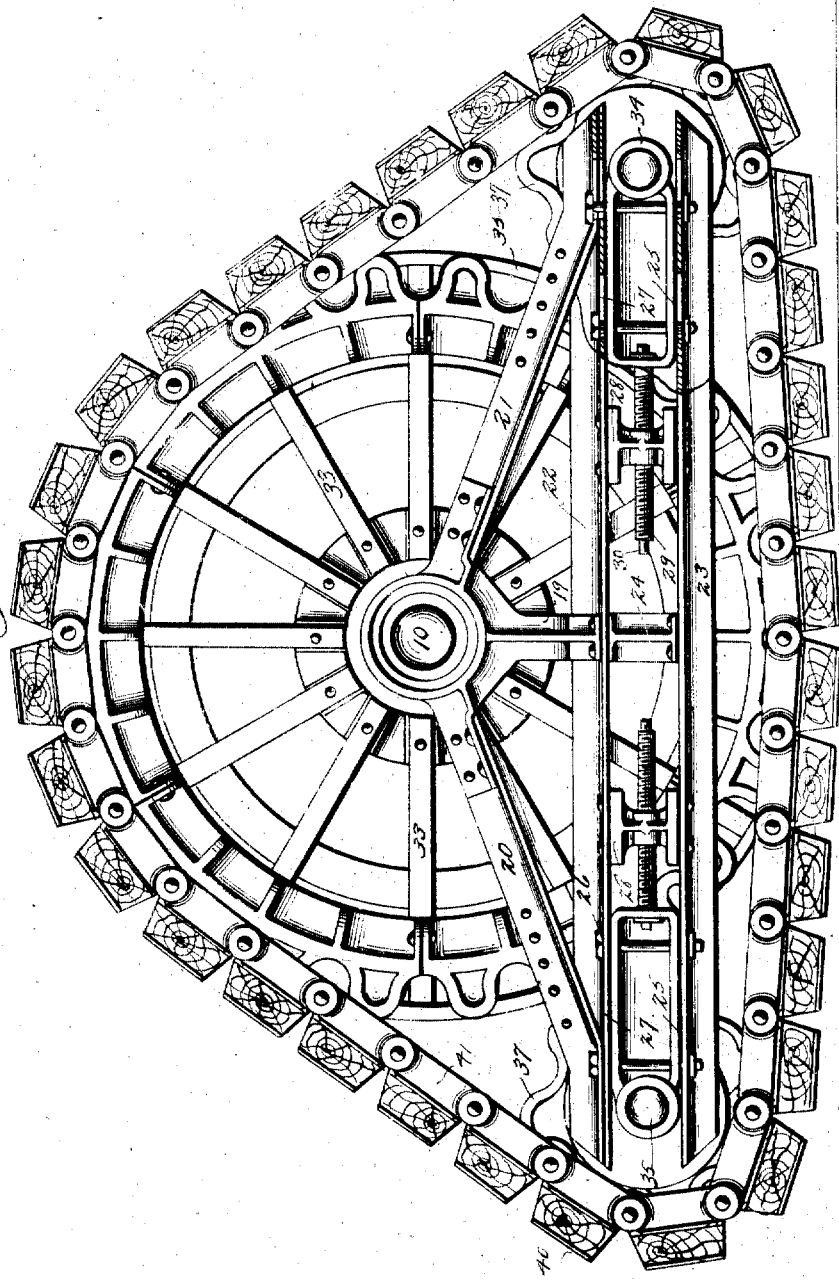

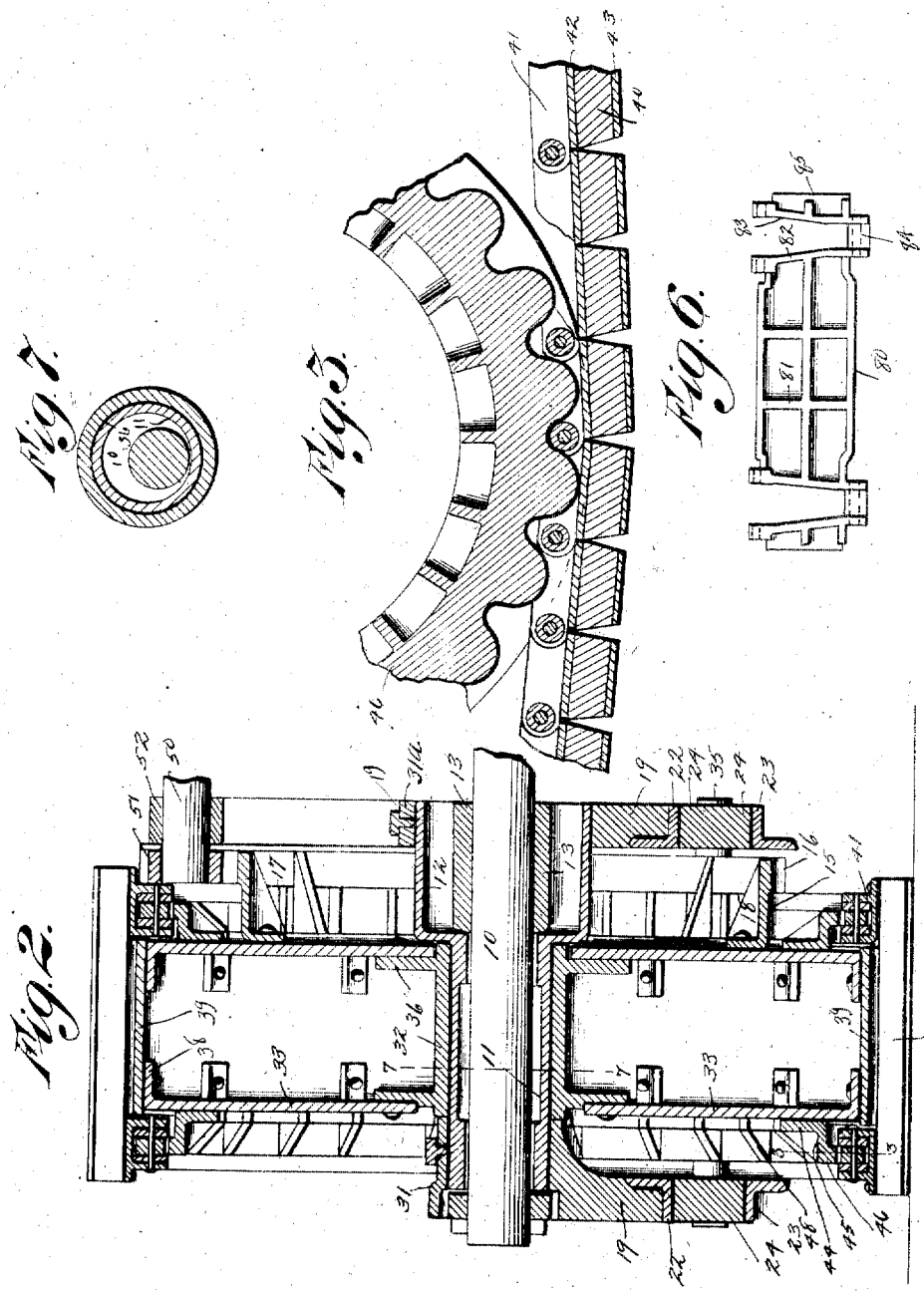
A. E. MILLER.
CATERPILLAR WHEEL.
APPLICATION FILED NOV. 17, 1913.
1,228,687.
Patented June 5, 1917.
3 SHEETS—SHEET 2.

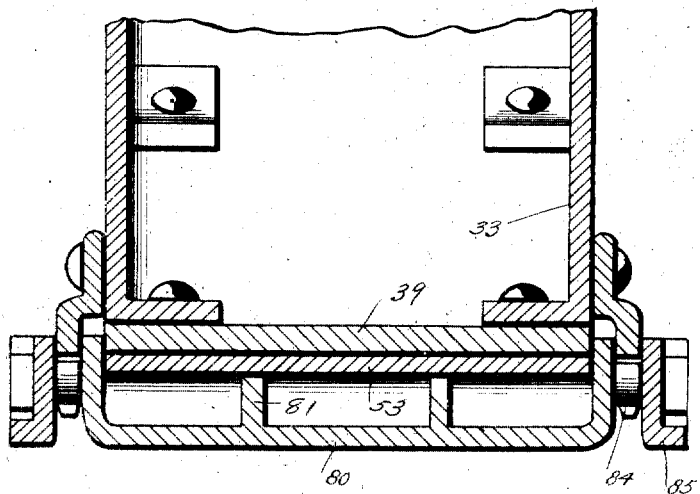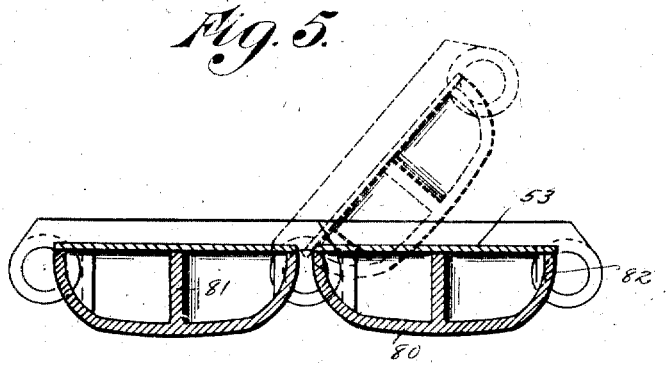

ARTHUR E. MILLER, OF NEWTON, IOWA, ASSIGNOR TO THE G. W. PARSONS COMPANY, OF NEWTON, IOWA.

CATERPILLAR-WHEEL.

1,228,687.  Specification of Letters Patent.  Patented June 5, 1917.

Application filed November 17, 1913. Serial No. 801,554.

*To all whom it may concern:*

Be it known that I, ARTHUR E. MILLER, a citizen of the United States, and resident of Newton, in the county of Jasper and State of Iowa, have invented a certain new and useful Caterpillar-Wheel, of which the following is a specification.

The object of my invention is to provide a caterpillar wheel of simple, durable and inexpensive construction, particularly designed for use on excavators and adapted for use on tractors and the like.

More particularly it is my object to provide a caterpillar wheel, so constructed and arranged that the ordinary wheel on a traction excavator or trench digger may be removed and my improved caterpillar wheel substituted for it on the axle so as to support a machine at the same height as by the ordinary wheel, and in no way destroying the three point suspension of the wheel.

Still a further object is to provide such a device in which the central tread portion, which rests upon the ground or other surface over which the device travels, is somewhat lower than the other portions of the traveling sprocket chains or similar devices.

Still a further object is to provide such a device having a frame of simple, inexpensive and very durable construction, so arranged and assembled that it may be readily and easily put together or taken apart for repairing or replacing parts.

A further object is to provide such a device having means whereby the tension on the tread carrying chains may be readily varied as desired.

Still a further object is to provide such a device having a sleeve designed to be mounted on the axle of the excavator or other machine and having supporting bearings in which said sleeve is eccentrically mounted.

My invention consists in certain details, in the construction, combination and arrangement of the various parts of the device, whereby the objects contemplated are attained, as hereinafter more fully set forth, pointed out in my claims, and illustrated in the accompanying drawings, in which:

Figure 1 shows a side elevation of a caterpillar wheel, embodying my invention.

Fig. 2 shows a transverse, central, vertical, sectional view through my device, taken on a line at right angles to the view shown in Fig. 1.

Fig. 3 shows a detail, sectional view, taken on the line 3—3 of Fig. 2.

Fig. 4 shows a detail, sectional view of a modified form of tread.

Fig. 5 shows a detail, sectional view of said modified form, taken on a line at right angles to the view shown in Fig. 4.

Fig. 6 shows a detail view of one of the treads of said modified form, and

Fig. 7 shows a sectional, detail view, on a line 7—7 of Fig. 2, showing the arrangement of the eccentric sleeve.

In the accompanying drawings I have used the reference numeral 10 to indicate generally the axle of a trench excavator or other machine on which my improved caterpillar wheel may be used. Mounted on the axle 10 is a sleeve 11, formed on one end of which is a hub 12. The shaft 10 is preferably mounted eccentrically in the sleeve 11. Mounted on the axle 10, within the hub 12 is a bearing 13. Rotatably mounted on the sleeve 11 is a hub 32, having annular flanges 36 spaced apart from each other. Secured to the flanges 36 of the hub 32 are a plurality of radially extending spokes 33. Secured to the outer surfaces of the spokes 33, on one side of the machine, is an annular rim 15, which is secured to the spokes 33 by means of bolts extended through said spokes and through the flange 17 formed on said rim. On the outside of the outer portion of the rim 15 are formed gear teeth 16. On the inner side of the rim 15 are formed a plurality of reinforcing ribs 18. The gear teeth 16 are somewhat shorter than the width of the rim 15. Rotatably mounted on the sleeve 11, on the end thereof opposite the sleeve 13, is a suitable bearing member 31, extending downwardly from which is a T iron frame member 19. Extending downwardly and away from the bearing member 31, on opposite sides thereof, are angle iron frame members 20 and 21. The lower ends of the frame members 21 and 19 are firmly secured to a horizontal frame member 22, preferably of angle iron. A parallel frame member 23 is spaced below the frame member 22. The middle portions of the frame members 22 and 23 are preferably connected by a T iron frame member 24.

Mounted between the outer ends of the frame members 22 and 23 are frames 25 arranged to have a limited sliding movement between the frame members 22 and 23, by means of bolts 26 extended through the frame members 25 and through elongated longitudinal slots 27 in the members 22 and 23. Mounted between the frame members 22 and 23, on opposite sides of the members 24, are frame members 28, having screw threaded openings extended through them. Mounted in said openings are screw threaded rods 29 having their adjacent inner ends 30 angular to receive a wrench. The outer ends of the rods 29 are round and are rotatably but non-slidably mounted in the frames 25. Mounted on the outer end of the hub 12 is a bearing member 31ª, secured to which are frame members 19, 20 and 21, similar in construction to those already described and located on the opposite side of the machine. The members 20, 19 and 21 support a similar frame construction to that already described. Formed on the outer ends of each of the frames 25 is a bearing 34. At each end of the machine a transverse shaft 35 is mounted in two of the bearings 34.

Mounted on the shafts 35, adjacent to the frame members 22 and 23, on opposite sides of the machine, are large sprocket wheels or rollers 37. The outer ends of the spokes 33 are provided with inwardly extending flanges 38 to which is bolted a flat rim 39. A tread device is provided in my machine which may be constructed as follows:

Blocks 40, having in cross section the shape of a truncated wedge, are arranged in succession and are connected at each end by a sprocket chain 41. The blocks 40 are preferably provided with metal plates 42 and 43 on their inner and outer surfaces. The blocks 40 receive the weight of the rim 39 of the large wheel.

On the outer sides of the spokes 33, near the outer ends thereof, are secured annular rings 44, formed on the outer edges of which are laterally extending annular flanges 45. On the outer edges of the flanges 45 are formed outwardly extending flanges 46 in parallel vertical planes. The flanges 46 are provided with sprocket teeth 47. The flanges 45 and rings 44 are reinforced by ribs 48.

It will be noted that the flanges 46 and the sprocket chains 41 are so located and arranged that the teeth 47, engage the sprocket chain links without imposing the weight of the large wheel on said chains. The chains 41 are extended over the sprocket teeth 47 at the top of each side of the large wheel, and over the sprocket gears and over the sprocket teeth 47 at the lower part of the large wheel. The tension on the sprocket chains may be varied by regulating the position of the frames 25.

Power is imparted to my improved caterpillar wheel from a shaft 50, suitably mounted on the frame of the main machine. On the shaft 50 is a small gear wheel 51 in mesh with the gear teeth 16. The shaft 50 is mounted on a frame 52 of the main machine.

In Figs. 4, 5 and 6, I have shown the preferred form of tread device for my improved caterpillar wheel. The device comprises a series of bodies 80, arranged transversely of the rim 39 and outside said rim, said tread members 80 being arranged in succession. The tread member 80 is hollow and is provided with reinforcing ribs 81 on the inside. I preferably also provide plates 53 to receive the weight of the rim 39.

Formed at each end of each body 80 are sprocket chain members 82. Spaced apart from each sprocket chain member 82 is a sprocket chain member 83, carrying a shoe 85. The members 82 and 83 are spaced apart farther from each other at one end than at the other so that the closer ends of said members on each portion of the tread device may be received between the spread members of the next succeeding portion of the tread device. The sprocket chain, and the members 82 and 83 of the succeeding tread devices are pivoted together by means of bolts 84. The side walls of the tread members 80 are curved from their upper edges downwardly and toward their central, transverse lines, as shown in Fig. 5, for a purpose which will be hereinafter more fully explained.

Where the tread device just described is used on my caterpillar wheel, the sprocket frames comprising the members 44 and 45 and 46 are secured to the spokes 33 nearer the periphery of the large wheel, as shown in Fig. 4, although even in the form of the device shown in Fig. 4 the weight of the device is designed to be imposed through the rim 39 upon the tread members 80 and not upon the sprocket chain members.

My improved caterpillar wheel has a large number of advantages, many of which may be seen from the foregoing description. The arrangement of the sleeve 11 in which the shaft 10 is eccentrically mounted enables me to vary the distance of the gear teeth 16 from the axle 10 so that if there should be any variation in the parts the gear teeth 16 and the gear teeth on the gear 51 may be made to come to a true mesh. The bearings 31 and 31ª may be secured in any position on the sleeve 11 by the means of the set screws shown in Fig. 2. On account of the arrangement of the frames and the position of the sprocket wheels 37 the central lower portion of the flexible tread device is lower than any other portion, making it much easier to turn the whole machine than could be done where the entire lower portion of the tread device is arranged in substantially the same horizontal plane. The manner in which my sprocket frames are mounted with relation to the sprocket chains enables the draft to be properly applied to the sprocket chains without imposing weight upon them, the weight being imposed upon the bodies of the flexible tread members, as shown in Figs. 2 and 4.

The preferred form of my flexible tread device is so constructed that stones or the like which might be gripped between the successive tread members are seized between the rounded side walls of said tread members and squeezed out so that the tread members will not be broken apart.

It will be seen that the parts of my improved caterpillar wheel are of comparatively simple construction and may be readily and easily assembled or taken apart. My wheel is so arranged that it may be built to be easily put on an axle to take the place of an ordinary wheel and the axle 10 will be supported at the same distance from the ground as would be the case if the ordinary wheel were employed. By simply removing the flexible tread device, the large wheel may be employed in propelling the machine.

I claim—

1. In a device of the class described, an axle, a sleeve mounted thereon, a wheel mounted on said sleeve, bearings on said sleeve on each side of said wheel, frames supported on said bearings, sprockets in said frames above the level of the lower part of the wheel, sprocket rims mounted on the sides of said wheel near the periphery thereof, a tread device comprising tread members arranged in succession, sprocket chains on the ends of said tread members arranged to travel over the sprocket wheels on each side of the first wheel and on the upper and lower parts of the respective sprocket rims.

2. In a device of the class described, an axle, a sleeve mounted thereon, a wheel mounted on said sleeve, bearings on said sleeve on each side of said wheel, frames supported on said bearings, sprockets in said frames above the level of the lower part of the wheel, sprocket rims mounted on the sides of said wheel near the periphery thereof, a tread device comprising tread members arranged in succession, sprocket chains on the ends of said tread members arranged to travel over the sprocket wheels on each side of the first wheel and on the upper and lower parts of the respective sprocket rims, said first wheel being provided with a rim which travels on the central parts of said tread members.

3. In a device of the class described, a sleeve, an axle eccentrically mounted therein, a wheel mounted on said sleeve, bearings adjustably mounted on said sleeve on each side of said wheel, frames supported on said bearings, sprockets in said frames above the level of the lower part of the wheel, sprocket rims mounted on the sides of said wheel near the periphery thereof, a tread device comprising tread members arranged in succession, sprocket chains on the ends of said tread members arranged to travel over the sprocket wheels on each side of the first wheel and on the upper and lower parts of the respective sprocket rims, a rim mounted on one side of said first wheel having gear teeth formed on the periphery thereof, a second shaft, and a gear wheel thereon in mesh with said teeth.

4. In a device of the class described, a sleeve, an axle eccentrically mounted therein, a driving tractor wheel mounted on said sleeve, a rim secured to said wheel, having gear teeth formed on its periphery, a second axle, and a gear wheel thereon in mesh with said teeth.

5. A device of the character described comprising in combination a pair of spaced side frames of substantially triangular formation having bearings at each corner thereof and having their lower sides disposed in substantially horizontal planes, bearing wheels mounted in the bearings of the lower and outer ends of said frames, means for adjusting said bearings longitudinally of the frames, a tractor wheel, means for rotatively supporting the tractor wheel from the bearings at the upper portions of said frames, means for adjusting such mounting of the tractor wheel with relation to a supporting axle, and an endless tread member comprising a central ground engaging portion upon which said tractor wheel travels and sprocket chains disposed outwardly thereof, said tractor wheel being provided with sprocket teeth for engagement with said sprocket chains, said tread member passing over said bearing wheels.

6. In a device of the class described, an axle, a wheel mounted thereon, a frame supported on said axle, and extending forwardly and rearwardly therefrom, sprocket wheels mounted in the ends of said frame, a sprocket rim mounted on the side of said first wheel near the periphery thereof, a tread device comprising tread members arranged in succession, and a sprocket chain on the ends of said tread members arranged to travel over the sprocket wheels and on the upper and lower parts of the sprocket rim.

Des Moines, Iowa, November 11, 1913.

ARTHUR E. MILLER.

Witnesses:
GEORGE F. LAMBERT,
NELLE TRUITT.